US008352099B1

(12) United States Patent
Eggold et al.

(10) Patent No.: US 8,352,099 B1
(45) Date of Patent: Jan. 8, 2013

(54) VARYING ENGINE THRUST FOR DIRECTIONAL CONTROL OF AN AIRCRAFT EXPERIENCING ENGINE THRUST ASYMMETRY

(75) Inventors: David P. Eggold, Everett, WA (US); Daniel R. Shapiro, Everett, WA (US); Kyle J. Gardner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 656 days.

(21) Appl. No.: 12/499,900

(22) Filed: Jul. 9, 2009

(51) Int. Cl.
G05D 1/00 (2006.01)

(52) U.S. Cl. .................................. 701/4; 244/75.1
(58) Field of Classification Search ............ 701/99, 701/5, 4; 244/213, 175, 179, 75.1; 702/151
See application file for complete search history.

(56) References Cited

U.S. PATENT DOCUMENTS

| 4,884,205 A | | 11/1989 | Hernandez-Diaz | |
|---|---|---|---|---|
| 5,330,131 A | | 7/1994 | Burcham et al. | |
| 5,657,949 A | * | 8/1997 | Deck et al. | 244/76 A |
| 5,852,237 A | * | 12/1998 | Renshaw | 73/180 |
| 6,041,273 A | | 3/2000 | Burken et al. | |
| 6,102,330 A | | 8/2000 | Burken et al. | |
| 6,273,370 B1 | * | 8/2001 | Colgren | 244/181 |
| 6,282,466 B1 | * | 8/2001 | Nolte et al. | 701/11 |
| 7,097,137 B2 | * | 8/2006 | McDonnell | 244/110 C |
| 7,146,299 B2 | * | 12/2006 | Cooke | 703/8 |
| 7,198,225 B2 | * | 4/2007 | Lisoski et al. | 244/55 |
| 7,605,750 B2 | * | 10/2009 | Tzidon | 342/357.32 |
| 7,770,842 B2 | * | 8/2010 | Benson | 244/75.1 |
| 7,802,756 B2 | * | 9/2010 | Kendall et al. | 244/45 R |
| 7,984,880 B2 | * | 7/2011 | Gomes | 244/230 |
| 8,016,243 B2 | | 9/2011 | Beaufrere | |
| 8,050,808 B2 | * | 11/2011 | Delporte et al. | 701/5 |
| 2003/0125848 A1 | * | 7/2003 | Otake et al. | 701/3 |
| 2004/0093130 A1 | * | 5/2004 | Osder et al. | 701/3 |
| 2005/0012642 A1 | * | 1/2005 | Sacle | 340/973 |
| 2007/0016343 A1 | * | 1/2007 | Hanel | 701/2 |
| 2008/0001028 A1 | * | 1/2008 | Kendall et al. | 244/75.1 |
| 2008/0234880 A1 | * | 9/2008 | Delporte et al. | 701/5 |
| 2010/0076625 A1 | * | 3/2010 | Yoeli | 701/4 |
| 2010/0241293 A1 | * | 9/2010 | Ganguli et al. | 701/4 |

OTHER PUBLICATIONS

U.S. Appl. No. 11/549,069, filed Oct. 12, 2006, entitled "Aircraft Backup Control," Inventor: Henry L. Beaufrere.
Jonathan How, course materials for 16.31 Feedback Control Systems, Fall 2007. MIT OpenCourseWare (http://ocw.mit.edu), Massachusetts Institute of Technology, Downloaded on Jul. 10, 2008.

(Continued)

Primary Examiner — Tuan C. To
(74) Attorney, Agent, or Firm — Hope Baldauff Hartman, LLC

(57) ABSTRACT

Technologies are described herein for providing additional yaw control to a multi-engine aircraft experiencing engine thrust asymmetry. A primary flight control system of the aircraft is configured to limit the operational thrust of an operating engine of the aircraft to provide additional yaw control when the aircraft is experiencing thrust asymmetry. The system includes a thrust limit module for calculating the maximum engine thrust limit to be imposed on an operating engine. The maximum engine thrust limit is calculated using inputs corresponding to the sideslip angle and the roll rate of the aircraft. The maximum engine thrust limit is imposed on the operating engine of the aircraft such that the operational thrust generated by the operating engine is limited to the maximum engine thrust limit. By reducing the operational thrust generated by the operating engine, the yawing caused by the thrust asymmetry is likely to be reduced.

12 Claims, 6 Drawing Sheets

OTHER PUBLICATIONS

Burcham, Frank W., Jr., et al. Manual Manipulation of Engine Throttles for Emergency Flight Control. (NASA Technical Memorandum 212045, Jan. 2004).

Burcham, Frank W., Jr., et al., Emergency Flight Control Using Only Engine Thrust and Lateral Center-of-Gravity Offset: A First Look. (NASA Technical Memorandum 4798, Jul. 1997).

"Advances in Thrust-Based Emergency Control of an Airplane," NASA. Sep. 1, 2003, retrieved from http://www.techbriefs.com/component/content/article/964 on Dec. 29, 2008.

Burcham, Frank W., Jr. et al., "Controlling Crippled Aircraft—With Throttles." NASA Technical Memorandum 104238. Sep. 1991.

Gilyard, Glenn B. et al., "A Simulation Evaluation of a Four Engine Jet Transport Using Engine Thrust Modulation for Flightpath Control." NASA Technical Memorandum 4324. Sep. 1991.

Burken, John et al., "Longitudinal Emergency Control System Using Thrust Modulation Demonstrated on an MD-11 Airplane." AIAA 96/3062. Jul. 3, 1996.

Williams-Hayes, Peggy, "Flight Test Implementation of a Second Generation Intelligent Flight Control System." NASA/TM-2005-213669. Nov. 2005.

Yu, Gwo-Ruley, "Nonlinear Fly-By-Throttle H_Infinity Control Using Neural Networks," Asian Journal of Control, vol. 3, No. 2, pp. 163-169, Jun. 2001.

Chu, Chung-Kuang et al., "Gain Scheduling for Fly-By-Throttle Flight Control Using Neural Networks," Proceedings of the 35th Conference on Decision and Control. Dec. 1996.

Jonckheere, Edmond, "Propulsion Control of Crippled Aircraft by H_infinity Model Matching," IEEE Transactions on Control System Technology, vol. 7, No. 2, Mar. 1999.

U.S. Official Action dated Jul. 14, 2008 in U.S. Appl. No. 11/549,069.

U.S. Official Action dated Jan. 5, 2009 in U.S. Appl. No. 11/549,069.

U.S. Official Action dated Jun. 18, 2009 in U.S. Appl. No. 11/549,069.

U.S. Official Action dated Apr. 26, 2010 in U.S. Appl. No. 11/549,069.

U.S. Official Action dated Nov. 8, 2010 in U.S. Appl. No. 11/549,069.

U.S. Notice of Allowance dated Mar. 7, 2011 in U.S. Appl. No. 11/549,069.

* cited by examiner

VARYING ENGINE THRUST FOR DIRECTIONAL CONTROL OF AN AIRCRAFT EXPERIENCING ENGINE THRUST ASYMMETRY

FIELD OF THE DISCLOSURE

The present disclosure relates generally to improving directional control on a multi-engine aircraft, and more particularly to providing additional yaw control to an aircraft experiencing engine thrust asymmetry.

BACKGROUND

In typical multi-engine aircraft configurations, the aircraft engines may be mounted symmetrically on opposing wing structures or on opposing sides of the aircraft fuselage. This symmetrical mounting creates equivalent moment arms for each engine with respect to the vertical axis of the aircraft, which negates any yawing moment induced by any particular engine when both engines are producing equivalent thrust. However, in the event of an engine failure, asymmetric throttle command or some other event that results in one engine producing greater thrust than the opposing engine, several adverse effects may take place.

The primary effect of asymmetric thrust is that the aircraft will tend to yaw in the direction of the engine producing lower thrust because of the greater torque generated about the vertical axis by the engine producing the greater thrust. This effect is often compounded in an engine failure situation where an inoperative engine may produce additional drag while the compressor fan blades create a windmilling effect in response to the incoming airflow. To overcome and control this induced yaw, a counteracting yawing moment may be introduced by deflecting the rudder. When the rudder is deflected, the corrective yawing moment produced by the rudder about the aircraft's vertical axis is dependent upon the velocity of airflow across the rudder, which in turn is dependent on the airspeed. As the aircraft decelerates, the rudder will need to be deflected further to maintain yaw control.

A problem arises, however, when a speed is reached where the yawing moment produced by the fully deflected rudder will just balance the thrust moment. If a roll maneuver is performed at this condition, there is no additional rudder deflection available to prevent the buildup of aircraft sideslip angle. Excessive sideslip angle in a roll may prevent the airplane from rolling at the rate and to the angle that the pilot intended. The amount of adverse sideslip angle may be dependent on the roll rate of the roll maneuver. This may occur primarily during a relatively low-speed rolling maneuver in which the aircraft is rolling toward the operative engine.

In the past, various techniques have been utilized to counter the yawing induced in an aircraft experiencing engine thrust asymmetry, particularly when full rudder deflection is insufficient to maintain control. For instance, one technique to counter yawing was to reduce the engine speed of an aircraft depending on the aircraft's bank angle. However, this solution may only work once the aircraft exceeds a threshold bank angle, even though the pilot may need additional yaw control at bank angles that may be smaller than the threshold bank angle. It also does not take into account the rate at which the airplane reached a given bank angle. Another solution is to design the aircraft with an increased vertical tail size to provide a rudder with sufficient surface area to increase control at slower airspeeds. However, increasing the vertical tail size undesirably increases the aircraft weight and drag, resulting in higher operating costs. Another solution is to increase the aircraft operating speeds so that the slower airspeeds that could result in insufficient rudder control would not be utilized. However, increasing operating speeds would increase the required takeoff and landing distances, thereby limiting the aircraft's airport options. Yet another solution is to reduce the designed aircraft thrust to limit the severity of a thrust asymmetry scenario to a limit that allows for retained controllability using rudder techniques. However, reducing the thrust of the aircraft would require larger takeoff distances and/or limit the payload, thereby also limiting the aircraft's airport options.

It is with respect to these considerations and others that the disclosure made herein is presented.

SUMMARY

Technologies are described herein for adding yaw control to an aircraft experiencing thrust asymmetry. According to one aspect of the disclosure, a method for providing additional yaw control to a multi-engine aircraft experiencing thrust asymmetry includes receiving an aircraft sideslip input corresponding to an aircraft sideslip angle and receiving an aircraft roll input corresponding to at least one of an aircraft roll command and an aircraft roll rate. The aircraft then calculates a maximum engine thrust limit of the aircraft using the aircraft sideslip input and the aircraft roll input. The aircraft then determines which engine's operational thrust of the aircraft is to be limited, upon which the operational thrust of the engine is limited according to the maximum engine thrust limit.

In another aspect of the disclosure, a primary flight control system for providing additional yaw control to a multi-engine aircraft experiencing thrust asymmetry includes a plurality of flight operations sensors, a thrust limit module, and an engine operations module. The thrust limit module is configured to receive flight operations parameters from the plurality of flight operations sensors and to utilize the flight operations parameters and a reference engine thrust to calculate a maximum thrust limit for an operational engine. The engine operations module is configured to detect asymmetric thrust and limit the operational thrust of the aircraft according to the maximum engine thrust limit.

In yet another aspect of the disclosure, a method for reducing the operational thrust of an engine of an aircraft experiencing thrust asymmetry includes receiving an aircraft sideslip input corresponding to an aircraft sideslip angle and receiving an aircraft roll input corresponding to at least one of an aircraft roll command and a aircraft roll rate. The aircraft then calculates a yawing moment coefficient of the aircraft using the aircraft sideslip input and the aircraft roll input. The aircraft then determines whether an operational thrust of the engine should be limited, and upon determining that the operational thrust of the engine should be limited, the operational thrust of the engine is limited according to the maximum engine thrust limit.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
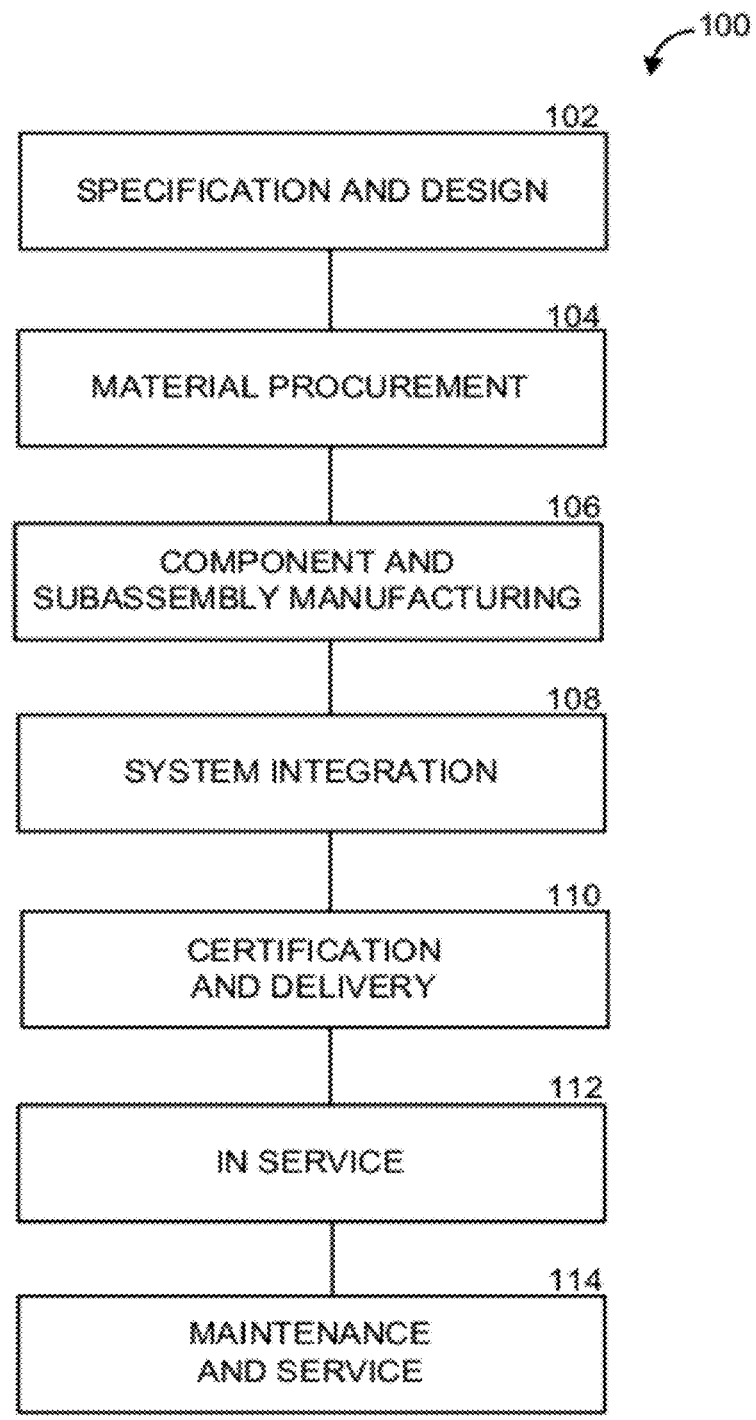
FIG. 1 is a flow diagram of an aircraft production and service methodology.
Figure 2:
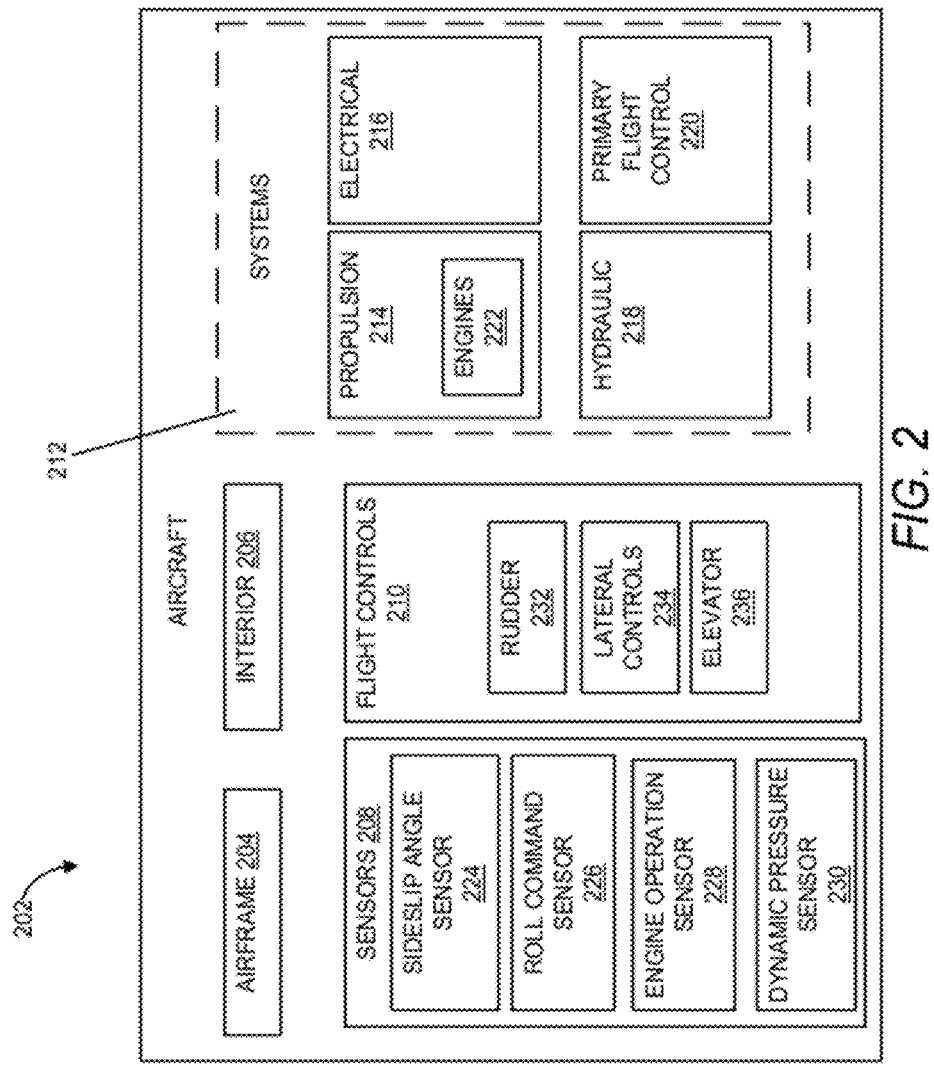
FIG. 2 is a block diagram of an aircraft, according to various embodiments presented herein.

The following detailed description is directed to apparatus and methods for providing yaw control to a multi-engine aircraft experiencing thrust asymmetry. In the following detailed description, references are made to the accompanying drawings that form a part hereof, and which are shown by way of illustration, specific embodiments, or examples. Referring now to the drawings, in which like numerals represent like elements through the several figures, providing additional yaw control to an aircraft experiencing thrust asymmetry according to the various embodiments will be described. Embodiments of the disclosure may be described in the context of an aircraft manufacturing and service routine 100 as shown in FIG. 1 and an aircraft 202 as shown in FIG. 2. During pre-production, routine 100 may include specification and design 102 of the aircraft 202 and material procurement 104. During production, component and subassembly manufacturing 106 and system integration 108 of the aircraft 202 takes place. Thereafter, the aircraft 202 may go through certification and delivery 110 in order to be placed in service 112. While in service by a customer, the aircraft 202 is scheduled for routine maintenance and service 114 (which may also include modification, reconfiguration, refurbishment, and other actions).

Each of the operations of routine 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and others.

As shown in FIG. 2, the aircraft 202 produced by routine 100 may include an airframe 204, an interior 206, sensors 208, flight controls 210 and a plurality of systems 212. Examples of high-level systems 212 include one or more of a propulsion system 214, which includes at least two aircraft engines 222, an electrical system 216, a hydraulic system 218, and a primary flight control system 220 that will be described in more detail in regard to FIGS. 4 and 5.

The flight controls 210 of the aircraft 202 include a rudder 232, lateral controls 234 and an elevator 236 to help the pilot control the rolling, yawing and pitching of the aircraft. Additionally, the aircraft 202 utilizes the sensors 208 to determine flight operating parameters that may be supplied to the plurality of systems, including the primary flight control system 220 for improved flight operations. The sensors 208 may include, at least, a sideslip angle sensor 224, a roll command sensor 226, an engine operation sensor 228 and a dynamic pressure sensor 230. The sideslip angle sensor 224 may be configured to continuously monitor the sideslip angle of the aircraft 202, which is the angle between the axis along the direction of travel and the longitudinal axis of the aircraft. The roll command sensor 226 may be configured to continuously monitor the amount of roll the aircraft is experiencing. In addition, the engine operation sensor 228 may continuously monitor the operational thrust generated by each engine 222, thereby being able to monitor whether the aircraft is experiencing thrust asymmetry. The dynamic pressure sensor 230 may continuously monitor the dynamic pressure acting upon the aircraft, as discussed in more detail below. It should be appreciated that flight operational parameters, such as the sideslip angle, the roll rate, and dynamic pressure may be monitored using sensors or other components on the aircraft not specifically designed to monitor these flight operational parameters. For instance, the roll rate of the aircraft may be determined by determining the position of the pilot wheel. Also, the roll rate of the aircraft may be the commanded roll rate, or in the alternative, may be a measured roll rate.

Figure 3:
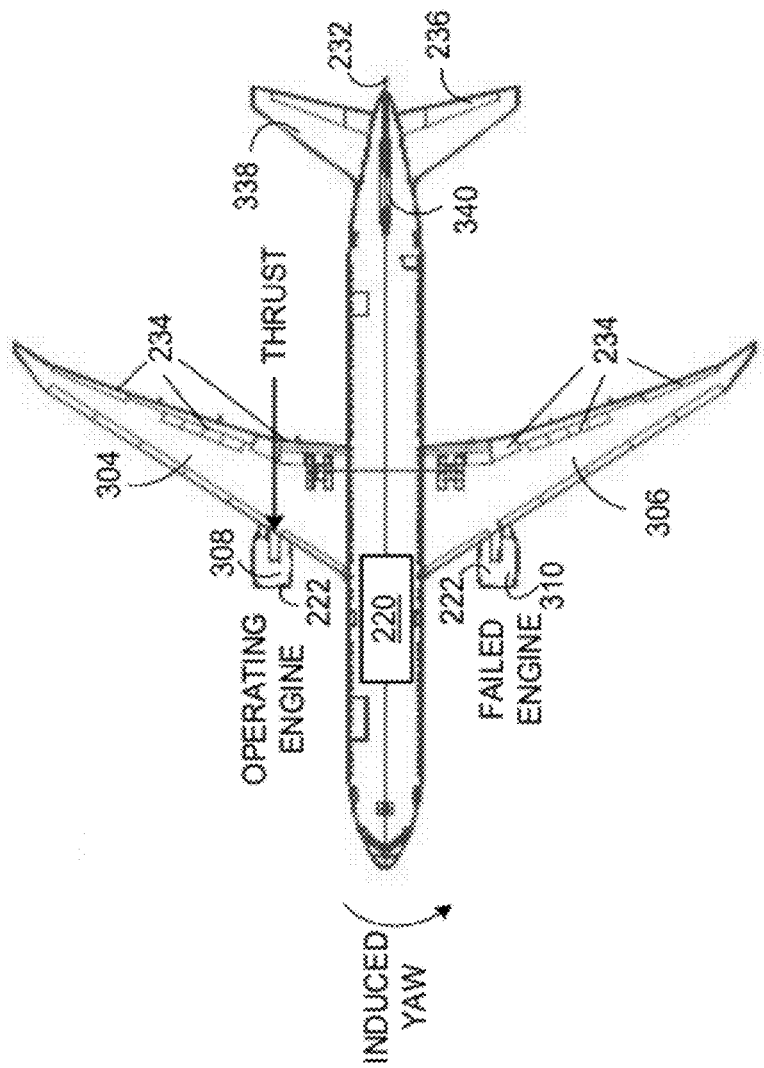
FIG. 3 is a top view of a multi-engine aircraft, according to embodiments described herein.

FIG. 3 shows a diagram illustrating one embodiment of a multi-engine aircraft 202 experiencing engine thrust asymmetry. The aircraft 202 includes the airframe 204, a first wing 304 attached to a first side of the aircraft 202 and a second wing 306 attached to a second side of the aircraft 202. The engines 222 include an operating engine 308 mounted to the first wing 304, and a failed engine 310 mounted to the second wing 306. It should be appreciated that the failed engine 310 may be an engine that is inoperative, unable to generate the same amount of operational thrust as a normally operating engine, or not generating an equivalent amount of operational thrust due to pilot or other input. In this asymmetrical thrust scenario, the operating engine 308 is producing an operational thrust that is greater than the operational thrust produced by the failed engine 310. For purposes of this disclosure, the operational thrust of any particular engine may be the amount of thrust generated by that particular engine at a given time. The operational thrust may be controlled by a pilot or an auto-pilot function of the aircraft, unless the engine is damaged or has failed, in which case the engine may not generate any operational thrust or an uncontrolled operational thrust.

In various embodiments, the engines 308 and 310 may be mounted and operated in such a manner that they produce an unequal net thrust, therefore increasing the possibility of the aircraft yawing. As a result of the asymmetric thrust, the aircraft 202 may yaw towards the failed engine, as indicated by the induced yaw arrow in FIG. 3. It should be appreciated that asymmetric thrust may be achieved either by operating the two engines at different operational thrust levels, or in an event where one of the engines may have failed or may be malfunctioning. It should also be appreciated that the multi-engine aircraft 202 may include more than two engines, and the engines may be located along various places on the aircraft. As discussed above, it should be clear that the present disclosure may be intended to cover multi-engine aircraft that experience thrust asymmetry, which may include the aircraft having a greater net thrust on one side of the aircraft relative to the other.

Still referring to FIG. 3, the aircraft 202 further includes flight controls, such as a rudder 232, lateral controls 234 and an elevator 236. The elevator 236 is attached to a horizontal stabilizer 338, and the rudder is attached to a vertical stabilizer 340. It should be appreciated that the use of the rudder 232, lateral controls 234 and the elevator 236 to control the direction of movement of the aircraft during flight is known to those skilled in the art. In addition, the aircraft 202 includes sensors 208 positioned on the aircraft that may be configured to gather flight operating parameters, such as the aircraft's roll rate, the aircraft's sideslip angle, and the dynamic pressure acting on the aircraft as discussed above in regard to FIG. 2. Further, additional sensors may be utilized to determine the operational thrust of the engines 308 and 310 of the aircraft 202, respectively. Other sensors may be configured to determine the position of the flights controls, including the position of the rudder, lateral controls and the elevator, among other data.

Figure 4:
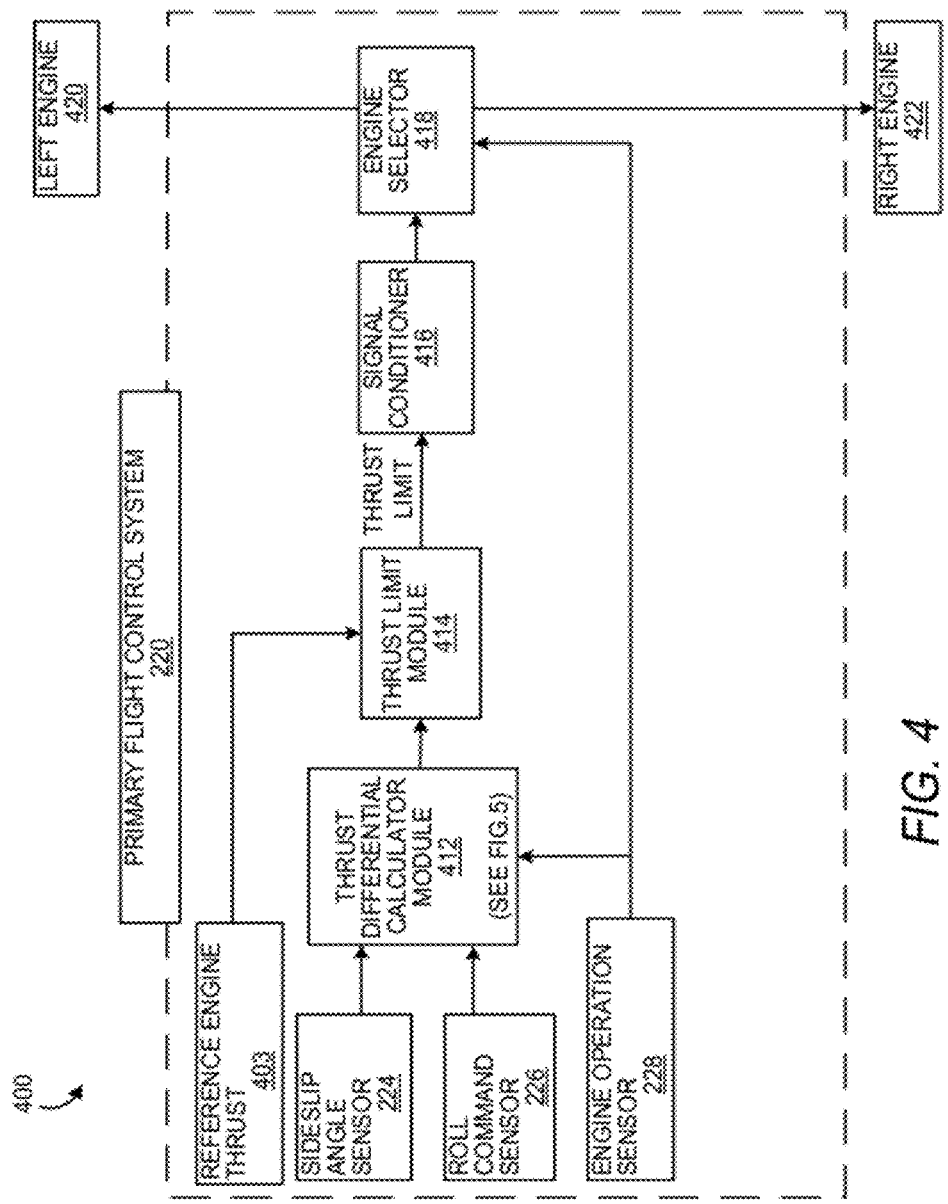
FIG. 4 is a diagram illustrating integrated circuit architectures of a primary flight control system associated with the multi-engine aircraft shown in FIG. 3, according to embodiments described herein.

As described briefly above in regard to FIG. 2, the aircraft 202 may include a primary flight control system 220 shown in FIG. 4. The primary flight control system 220 may be responsible for controlling various flight controls 210, including but not limited to providing additional yaw control to an aircraft experiencing thrust asymmetry in the manner described herein. It should be understood that the primary flight control system 220 may be a software module executing on a computing device or may be hardware configured to provide the functionality described herein.

As described above, an aircraft experiencing thrust asymmetry experiences a torque, or yawing moment, about its center of gravity due to an unbalance of thrust. The aircraft may tend to yaw in the direction of the engine producing lower thrust because of the greater torque generated about the vertical axis by the engine producing the greater thrust. This yawing moment may be balanced by deflecting the rudder or rudders. As the thrust asymmetry increases, a greater rudder deflection is required to counter the yawing moment. When the rudder is deflected, the corrective yawing moment produced by the rudder about the aircraft's vertical axis is dependent upon the dynamic pressure at the rudder surface, which in turn is dependent on the airspeed. Likewise, flying at a lower speed with a given thrust asymmetry would require more rudder to balance the aircraft because of lower dynamic pressure at the rudder surface. At some combination of thrust asymmetry and airspeed, the rudder may reach full deflection in order to balance the thrust asymmetry.

Typically, additional yaw control may be needed when the aircraft is attempting to perform a roll maneuver, such as when the aircraft changes bank angle to initiate a turn. When the aircraft performs a roll maneuver, yawing moment may be required because the roll rate produces an aerodynamic yawing moment in the direction that is adverse to the roll maneuver. The roll maneuver also may require some yawing motion to produce a yaw rate. Proper coordination of roll rate and yaw rate is needed to prevent an increase in adverse sideslip angle. Therefore, additional yawing moment is required to produce this yawing motion. When the aircraft is rolling in the direction of the failed engine, the rudder can be moved away from full deflection to provide the needed yawing moment, thereby facilitating the aircraft turning in the direction of the failed engine. However, when the aircraft is attempting to perform a roll maneuver in the direction of the operating engine, the rudder may not be able to move further in the required direction and therefore, the aircraft requires additional yaw control that the rudder may not be able to supply. In order to provide additional yaw control to the aircraft, the operational thrust of the operating engine may need to be reduced, such that the yawing moment produced by the thrust asymmetry between the operating engine and the failed engine is also reduced.

The present disclosure includes a roll rate dependency to supply additional yawing moment for executing the roll maneuver, and a sideslip angle dependency to supply additional yawing moment to reduce adverse sideslip angle that may develop.

In various embodiments of the present disclosure, the operational thrust of the operating engine may be reduced to a maximum engine thrust limit only when the aircraft is rolling into the operating engine, and additional directional control is needed. The maximum engine thrust limit is the upper limit on the amount of operational thrust that may be generated by a particular engine. In a twin-engine aircraft, the maximum engine thrust limit may be imposed only on the operating engine, since the failed engine may not be producing any operational thrust.

It should be appreciated that according to embodiments, the primary flight control system 220 may not limit the operational thrust of the operating engine to the maximum engine thrust limit, such as during conditions that may alter the certified climb capability of the aircraft, including conditions of symmetric thrust flight, or during conditions with asymmetric thrust, when the aircraft is being controlled without full rudder deflection or when the aircraft is experiencing a thrust asymmetry and performs a roll maneuver at a low roll rate.

Looking at FIG. 4, the manner in which the primary flight control system 220 determines the maximum engine thrust limit to apply to the operating engine will be described. As previously discussed, the maximum engine thrust limit may be the maximum amount of operational thrust that an operating engine 308 may generate in order to provide additional yaw control to the aircraft attempting to perform a roll maneuver, in the event that the aircraft 202 is experiencing thrust asymmetry. The maximum engine thrust limit may vary depending on various flight operations parameters of the aircraft, including but not limited to the roll rate, the sideslip angle and the operational thrust differential between one side of the aircraft and the other side. The primary flight control system 220 includes a thrust limit module 414 that may calculate the maximum engine thrust limit to apply to the operating engine 308 of the aircraft 202, which is then imposed on the operating engine of the aircraft using engine controllers. After the maximum engine thrust limit is calculated at the thrust limit module 414, the maximum engine thrust limit is supplied to a signal conditioner 416, which conditions the maximum engine thrust limit signal and supplies it to an engine selector 418, which determines which engine to apply the maximum engine thrust limit to.

The thrust limit module 414 receives a thrust differential signal and a reference engine thrust signal that may represent a thrust schedule that is equal to or greater than the thrust capability of engines 222. The reference engine thrust signal may be defined to exceed the thrust capability of engines 222 in a way that causes operational thrust to not be limited for roll maneuvers at flight conditions where additional yaw control from the operating engine is not desired. Further, the reference engine thrust signal may be a predefined engine thrust that is pre-programmed in the primary flight control system 220.

The primary flight control system 220 also includes a thrust differential calculator module that receives inputs from the sideslip angle sensor, the roll command sensor and the dynamic pressure sensor to calculate the thrust differential, which is supplied to the thrust limit module 414 as a thrust differential signal. Further details regarding the operation of the primary flight control system 220 are described below.

In the illustrated embodiment of the primary flight control system 220, the thrust differential calculator module 412 may be configured to receive a sideslip angle of the aircraft from the sideslip angle sensor 224 that monitors the sideslip angle of the aircraft 202 and to receive a roll rate from the roll command sensor 226 that monitors the roll rate of the aircraft 202. In various embodiments, the roll rate may be a commanded roll rate or a commanded lateral control deflection or may be a measured roll rate, and may be controlled by a pilot, through an auto-pilot function of the aircraft or through any another control mechanism of the aircraft. It should be appreciated that various embodiments of the present disclosure may include a variety of ways for determining as well as supplying the sideslip angle and the roll rate of the aircraft to various components of the primary flight control system 220. It should also be appreciated that the present disclosure is not limited to embodiments that utilize the sideslip angle and the roll rate of the aircraft, but includes embodiments where the maximum engine thrust limit is calculated using input values related to the sideslip angle and roll command and/or roll rate of the aircraft, such as lateral acceleration amongst others.

The primary flight control system 220 further includes the engine operation sensor 228 that may detect thrust asymmetry experienced by the aircraft. The engine operation sensor 228 may supply an engine asymmetry signal to the thrust differential calculator module 412 of the primary flight control system 220. The engine asymmetry signal indicates whether the aircraft is experiencing thrust asymmetry, and may also include the direction of the thrust asymmetry. In various embodiments, the engine asymmetry signal may also include information relating to the magnitude of the thrust asymmetry. In one embodiment, the thrust differential calculator module 412 may operate as a multiplexor that may calculate a thrust differential when the engine asymmetry signal indicates that the aircraft is experiencing thrust asymmetry and additional yaw control is needed. Further details regarding the thrust differential calculator module and how the thrust differential is calculated are described below in FIG. 5.

Upon calculating the thrust differential, the thrust differential calculator module 412 may generate and supply the thrust differential to the thrust limit module 414 of the primary flight control system 220. The thrust limit module 414 may be configured to receive the thrust differential from the thrust differential calculator module 412 and the reference engine thrust from a reference engine thrust input 403 of the primary flight control system 220. In various embodiments, the thrust limit module 414 may be configured to calculate the maximum engine thrust limit by subtracting the thrust differential from the reference engine thrust of the operating engine.

Figure 5:
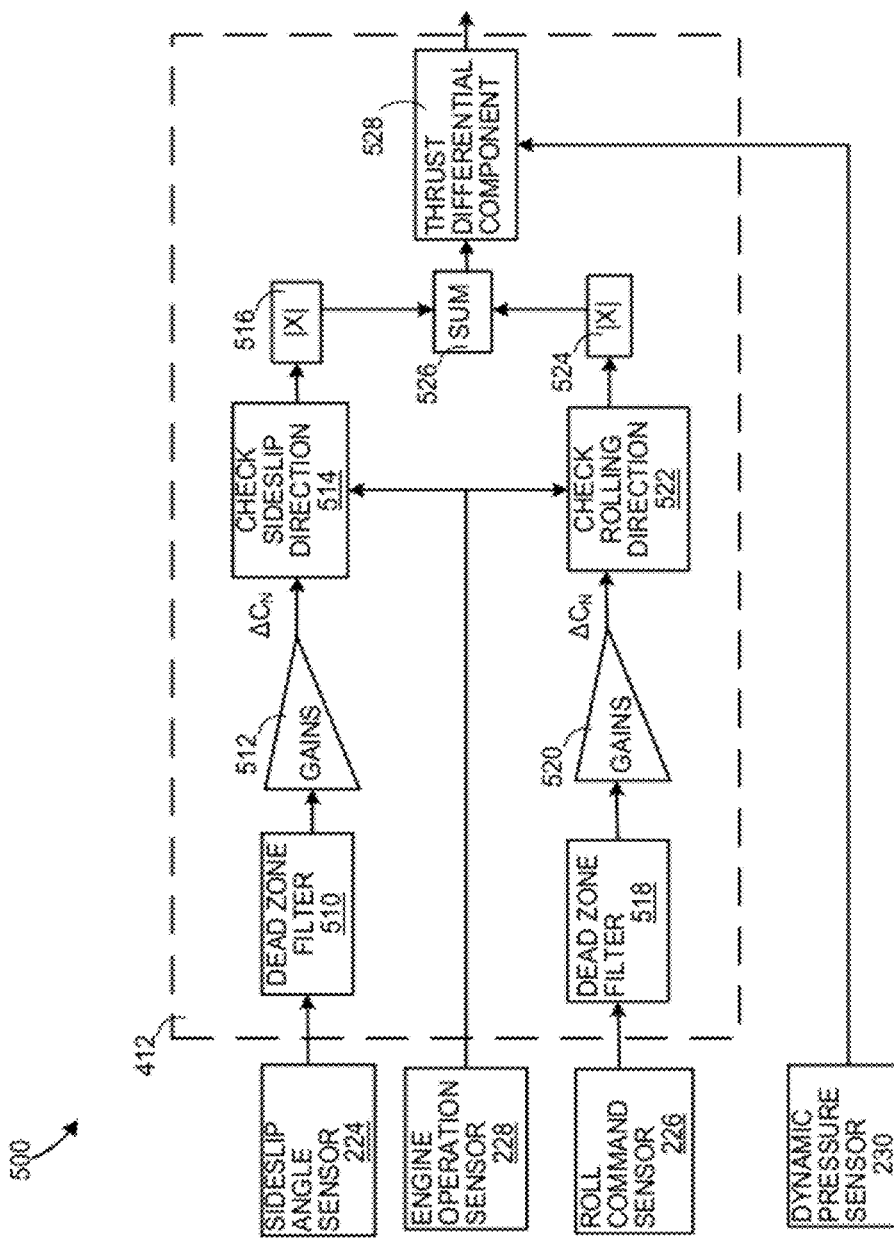
FIG. 5 is a diagram illustrating integrated circuit architecture of a thrust differential calculator module utilized within the primary flight control system of FIG. 4, according to embodiments described herein.

FIG. 5 illustrates a detailed view of one embodiment of the thrust differential calculator module 412 of the multi-engine aircraft described above in FIG. 4. The thrust differential calculator module 412 may be configured to receive the sideslip angle of the aircraft from the sideslip angle sensor 224. The thrust differential calculator module 412 may also be configured to receive the roll rate from the roll command sensor 226 and an engine asymmetry signal from an engine operation sensor 228. The thrust differential calculator module 412 determines the change in yawing moment that may be desired due to the change in the sideslip angle and the roll rate of the aircraft, and upon determining the change, calculates the appropriate thrust differential to provide additional yaw control to the aircraft, as described above. It should be appreciated that in the present embodiment, the thrust differential may be subtracted from the reference engine thrust value. The thrust of the operating engine will only be limited if the maximum engine thrust limit is less than the commanded thrust. If the maximum engine thrust limit exceeds the commanded thrust, the operating engine may be able to generate the commanded thrust, as desired. In various embodiments the thrust differential may be a positive value or a negative value, such that the maximum engine thrust limit may be increased or decreased depending on the value of the thrust differential.

In one embodiment, the thrust differential calculator module 412 includes a sideslip dead zone filter 510 that may be configured to receive the sideslip angle from the sideslip angle sensor 224 and generate an output that varies upon the sideslip angle of the aircraft. For instance, in one embodiment, the sideslip dead zone filter 510 may have a threshold sideslip angle range that may be predefined in the filter 510. The threshold sideslip angle range is a range of sideslip angle values between which the filter 510 generates a zero output. If the sideslip angle of the aircraft does not fall within the threshold sideslip angle range, the filter 510 generates a sideslip differential value that may be equal to the smallest difference between the sideslip angle of the aircraft and the threshold sideslip angle range. The threshold sideslip angle range may be set and adjusted depending on the flight conditions of the aircraft. In one embodiment, the threshold sideslip angle value may be 5°, which means that if the sideslip angle lies between −5° and +5°, the filter outputs a zero. However, if the sideslip angle is greater than +5°, the filter may generate a differential value that is the difference between the sideslip angle and +5°. If the angle is less than −5°, the filter may generate a differential value that is the difference between the sideslip angle and −5°. Therefore, if the sideslip angle is +6°, the filter generates a differential value equal to one. If the sideslip angle is +7°, the filter may generate a differential value equal to two.

Upon generating a sideslip differential value, the sideslip dead zone filter 510 supplies the sideslip differential value to a sideslip gain component 512. The sideslip gain component 512 may receive the sideslip differential value and may apply a gain to the sideslip differential value that is equal to the amount of yawing moment coefficient per degree exceedance of the threshold sideslip angle value. The sideslip gain component 512 may then generate a sideslip gain signal equal to the gain applied to the sideslip differential value, and supply the sideslip gain signal to a sideslip directional control component 514. In various embodiments, the sideslip gain signal represents the yawing moment coefficient change that may be desired in response to the change in the sideslip angle of the aircraft.

The sideslip directional control component 514 may be configured to receive the sideslip gain signal from the sideslip gain component 512 and the engine asymmetry signal from the engine operation sensor 408. The sideslip directional control component 514 may then check the direction in which the aircraft is sideslipping. The engine operation sensor 228 may be configured to detect whether thrust asymmetry exists, and which side of the aircraft the failed engine 310 is attached to. Depending on the direction in which the aircraft is sideslipping, the sideslip directional control component 514 may or may not allow the sideslip gain signal to pass through. If the aircraft 202 is sideslipping in the direction towards the operating engine 308, it may be desirable to reduce the operational thrust of the operating engine 308 and therefore, the sideslip directional control component 514 may allow the sideslip gain signal to pass through the sideslip directional control component 514. However, if the aircraft 202 is sideslipping in the direction of the failed engine 310, there may be no need to reduce the operational thrust of the operating engine 308, in which case, the sideslip gain signal may not pass through the sideslip directional control component 514.

The thrust differential calculator module 412 further includes a sideslip absolute component 516, which may be configured to receive the sideslip gain signal from the sideslip directional control component 514 and may generate an absolute sideslip gain signal, which is an absolute value corresponding to the value represented by the sideslip gain signal. The sideslip absolute component 516 may remove any directional references to the sideslip gain signal as the direction in which the aircraft is sideslipping will again be determined and taken into consideration by the engine selector 418. As described above in FIG. 4, the engine selector 418 of the primary flight control system 220 may determine which engine to apply the thrust limit to. The engine selector 418 may also operate as an engine controller, such that it is capable of controlling the operational thrust of the engines. The absolute sideslip gain signal may then be supplied to an adding component 526, which will be described in more detail below.

The thrust differential calculator module 412 further includes a roll rate dead zone filter 518, a roll rate gain component 520, a roll rate directional control component 522 and a roll rate absolute component 524. In various embodiments, the functions of the roll rate dead zone filter 518, the roll rate gain component 520, the roll rate directional control component 522 and the roll rate absolute component 524 operate similar to the corresponding components described above in reference to the sideslip angle portion of the thrust differential calculator module 412.

In the present embodiment, the thrust differential calculator module 412 may receive the roll rate signal from the roll command sensor 226. The roll rate signal may be supplied to the roll rate dead zone filter 518, which may generate a roll rate differential value that varies upon the roll rate of the aircraft 202. For instance, in one embodiment, the roll rate dead zone filter 518 may have a threshold roll rate range that may be predefined in the filter 518 and may also be adjusted depending on the flight conditions of the aircraft 202. The filter 518 may generate the roll rate differential value if the roll rate does not fall within the threshold roll rate range, and a zero if the roll rate falls within the threshold roll rate range.

In one embodiment, the threshold roll rate range may be 5 degrees per second (5°/s), which means that if the roll rate lies between −5°/s and +5°/s, the filter 518 outputs a zero. However, if the roll rate is greater than +5°/s, the filter may generate a differential value that is the difference between the roll rate and +5°/s. If the roll rate is less than −5°/s, the filter may generate a roll rate differential value that is the difference between the roll rate and −5°/s. Therefore, if the roll rate is 15°/s, the filter generates a differential value equal to 10°/s. If the roll rate is +20°/s, the filter may generate a differential value equal to 15°/s. If the roll rate is −20°/s, the filter generates a differential value equal to −15°/s. Upon generating a roll rate differential value, the roll rate dead zone filter 518 supplies the roll rate differential value to the roll rate gain component 520. The roll rate gain component 520 may receive the roll rate differential value and may apply a gain to the roll rate differential value that is equal to the amount of yawing moment coefficient per unit exceedance of the threshold roll rate range. The roll rate gain component 520 may then generate a roll rate gain signal equal to the gain applied to the roll rate differential value, and supply the roll rate gain signal to a roll rate directional control component 522. In various embodiments, the roll rate gain signal represents the yawing moment coefficient change that may be desired in response to the change in the roll rate of the aircraft.

The roll rate directional control component 522 may be configured to receive the roll rate gain signal from the roll rate gain component 520 and the engine asymmetry signal from the engine operation sensor 408. The roll rate directional control component 522 may then check the direction in which the aircraft 202 is rolling, relative to the thrust asymmetry of the aircraft. The engine operation sensor 228 may be configured to detect whether a thrust asymmetry exists, and which side of the aircraft 202, the failed engine 310 is attached to. Depending on the direction of the rolling, the roll rate directional control component 522 may or may not allow the roll rate gain signal to pass through. If the aircraft 202 is rolling in the direction towards the operating engine 308, it may be desirable to reduce the operational thrust of the operating engine 308 and therefore, allow the roll rate gain signal to pass through the roll rate directional control component 522. However, if the aircraft 202 is rolling in the direction towards the failed engine 310, there may be no need to reduce the operational thrust of the operating engine 308. Consequently, the roll rate gain signal may not pass through the roll rate directional control component 522.

The thrust differential calculator module 412 further includes the roll rate absolute component 524, which may be configured to receive the roll rate gain signal from the roll rate directional control component 522 and may generate an absolute roll rate gain signal, which is an absolute value corresponding to the value represented by the roll rate gain signal. The roll rate absolute component 524 may remove any directional references to the roll rate gain signal because the direction in which the aircraft 202 is rolling will again be determined and taken into consideration by the engine selector 418. The roll rate absolute component 524 may be configured to supply the absolute roll rate gain signal to the adding component 526, where the absolute roll rate gain signal may be added to the absolute sideslip gain signal. The sum of the absolute roll rate gain signal and the absolute sideslip gain signal may be equal to the total yawing moment coefficient ($C_N$) differential of the thrust differential calculator module 412 under the flight operating parameters received by the thrust differential calculator module 412.

Upon calculating the total yawing moment coefficient differential, the adding component 526 supplies the total yawing moment coefficient differential to a thrust differential component 528. The thrust differential component calculates the thrust differential using the formula below:

Thrust Differential=(Dynamic Pressure*Wing Span*Wing Area*Total Yawing Moment Coefficient Differential)/Engine Moment Arm.

The wing area, the wing span and the engine moment arm may be specific to the aircraft, and may be pre-defined values stored in the primary flight control system.

As described above, once the thrust differential calculator module 412 determines the thrust differential, the thrust differential calculator module 412 supplies the thrust differential to the thrust limit module 414, which subtracts the thrust differential from the reference engine thrust signal to determine the maximum engine thrust limit, as described in the formula below:

Maximum Engine Thrust Limit=Reference Engine Thrust−Thrust Differential.

Figure 6:
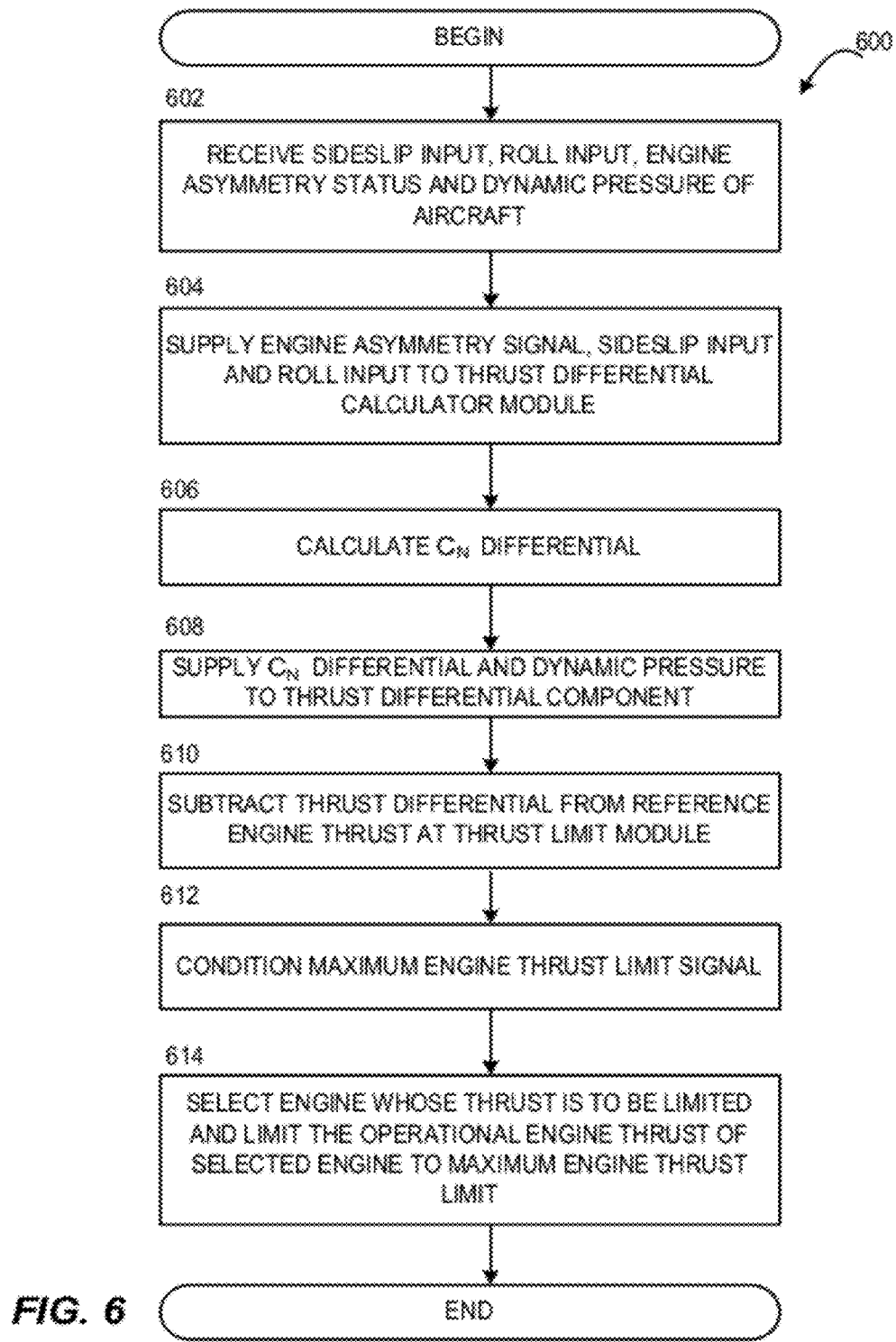
FIG. 6 is a logical flow diagram illustrating a routine for limiting the operating engine thrust of a multi-engine aircraft, according to embodiments described herein.

Turning now to FIG. 6, additional details will be provided regarding the embodiments presented herein for providing additional yaw control by reducing the operational thrust of an operating engine of an aircraft experiencing thrust asymmetry. In particular, FIG. 6 is a logical flow diagram illustrating a routine 600 for limiting the operational thrust of an operating engine to a maximum engine thrust limit determined based on signals corresponding to at least the sideslip angle and roll rate of an aircraft experiencing thrust asymmetry, according to embodiments described herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in hardware, in firmware, in special purpose digital logic, and any combination thereof. It should also be appreciated that more or fewer operations may be performed than shown in the figures and described herein. These operations may also be performed in parallel, or in a different order than those described herein. In addition, it may be appreciated that the present disclosure may be implemented in a strictly mechanical fashion, or may include operations that are mechanically implemented.

The routine 600 begins at operation 602 where the primary flight control system receives a sideslip angle from the sideslip angle sensor 224, a roll rate from the roll command sensor 226, an engine asymmetry signal from the engine operation sensor 408 and the dynamic pressure of the aircraft from the dynamic pressure sensor 230. These sensors, as described above, may be positioned on the aircraft to continuously collect and supply various flight conditions of the aircraft during operation.

The routine 600 proceeds from operation 602 to operation 604, where the primary flight control system 220 supplies the sideslip angle signal, the roll rate signal and the engine asymmetry signal to the thrust differential calculator module 412. The routine 600 then proceeds to operation 606, where the thrust differential calculator module 412 calculates the total yawing moment coefficient differential, as described in detail in FIG. 5, for the particular flight operating parameters supplied by the respective sensors of the aircraft. From operation 606, the routine 600 proceeds to operation 608, where the thrust differential calculator module 412 then supplies the total yawing moment coefficient differential and the dynamic pressure of the aircraft to the thrust differential calculator component 528, which calculates the thrust differential based on the formula represented by Thrust Differential=(Dynamic pressure*Wing Area*Wing Span*Total Yawing Moment Coefficient Differential)/(Engine Moment Arm), where the wing area, wing span and engine moment arm may be specific to the aircraft 202.

It should be understood that the maximum engine thrust limit calculated by the thrust limit module 414 is represented in the form of a signal, which is then supplied to a signal conditioner 416, where the maximum engine thrust limit is conditioned at operation 612. It should be appreciated that the maximum engine thrust limit may fluctuate continuously due to the continuous variations in flight conditions of the aircraft. These fluctuations may adversely affect the performance, and therefore the maximum engine thrust limit is conditioned to account for the fluctuations in the signal. Conditioning the signal may help improve the engine's ability to accept and respond to the maximum engine thrust limit. In various embodiments, the signal is made smoother by passing it through the signal conditioner 416.

From operation 612, the routine 600 proceeds to operation 614, where the primary flight control system 220 supplies the engine asymmetry signal to the engine selector 418, where the primary flight control system determines which engine's thrust should be limited. Upon determining which engine's operational thrust should be limited, the primary flight control system imposes the maximum engine thrust limit upon the selected engine whose thrust should be limited. In various embodiments, the engine selector may be an engine controller that is configured to control the operational thrust generated by the engines. Further, the engine controller of the aircraft may operate on different parameters, such as N1, pressure ratio, torque or manifold pressure. Therefore, the primary flight control system 220 may be configured to convert the maximum engine thrust limit to a parameter that may allow the engine controller to limit the operational thrust of the engine to the maximum engine thrust limit. Upon limiting the maximum engine thrust limit of the selected engine, the routine 600 ends.

The present disclosure described herein may provide additional yaw control to a multi-engine aircraft by limiting the operational thrust of the aircraft. In various embodiments, the maximum engine thrust limit may be applied at all times, but only limits the operational thrust of the operating engine when specific flight conditions are met. For instance, the reference engine thrust may be set equal to the engine thrust capability only at lower airspeeds or altitudes such that the rudder may need to be fully deflected before the operational thrust of the engine may be limited. Further, as described above, the dead zone filters inside the $C_N$ coefficient limit calculator module may only allow the primary flight control system to limit the operational thrust of the engine when the sideslip angle and the roll rate of the aircraft exceeds a predefined threshold value. Additionally, the operational thrust of the engine may only be limited when the aircraft is rolling into the operative engine and additional yaw control is needed. In this way, the operational thrust of the engine may not be limited under conditions that would alter the certified climb capability of the aircraft.

It should also be appreciated that various embodiments of the present disclosure may include software implementations, which may require no or little hardware alterations to implement on existing aircrafts.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for providing additional yaw control to a multi-engine aircraft experiencing thrust asymmetry, comprising:
   receiving an aircraft sideslip input corresponding to an aircraft sideslip angle of the aircraft;
   receiving an aircraft roll input corresponding to at least one of an aircraft roll command and an aircraft roll rate;
   calculating a maximum engine thrust limit with a primary flight control system of the multi-engine aircraft using the aircraft sideslip input and the aircraft roll input and a reference engine thrust value;

determining with the primary flight control system which aircraft engine's operational thrust is to be limited; and limiting the operational thrust of the engine according to the maximum engine thrust limit.

2. The method of claim 1, wherein determining which aircraft engine's operational thrust is to be limited comprises receiving an engine asymmetry signal indicating a direction of the thrust asymmetry.

3. The method of claim 1, further comprising calculating a total yawing moment coefficient differential using the sideslip input and the roll input of the aircraft.

4. The method of claim 3, wherein calculating the thrust differential comprises:

receiving an engine asymmetry signal;

calculating a sideslip angle yawing moment coefficient differential using the aircraft sideslip input;

calculating a roll rate yawing moment coefficient differential using the aircraft roll input; and operatively combining the sideslip angle yawing moment coefficient differential and the roll rate yawing moment coefficient differential to calculate the total yawing moment coefficient differential.

5. The method of claim 1, wherein calculating the maximum engine thrust limit using the aircraft sideslip input and the aircraft roll input comprises:

receiving a dynamic pressure of the aircraft;

determining a wing area and a wing span of a wing of the aircraft;

determining a total yawing moment coefficient differential of the aircraft based on the aircraft sideslip input and aircraft roll input of the aircraft;

receiving an engine moment arm of the aircraft;

multiplying the dynamic pressure, the wing area, the wing span, the total yawing moment coefficient differential and the inverse of the engine moment arm of the aircraft to calculate the thrust differential;

receiving a reference engine thrust; and operatively combining the thrust differential and the reference engine thrust to calculate the maximum engine thrust limit.

6. The method of claim 1, further comprising deflecting a rudder to a maximum rudder deflection limit in a direction of the engine whose operational thrust is to be limited.

7. The method of claim 1, wherein limiting the operational thrust of the engine according to the maximum engine thrust limit comprises:

generating a maximum engine thrust limit signal;

smoothing the maximum engine thrust limit signal; and supplying the maximum engine thrust limit signal to the engine whose operational thrust is to be limited.

8. A method for reducing the operational thrust of an engine of an aircraft experiencing thrust asymmetry, comprising:

receiving an aircraft sideslip input corresponding to an aircraft sideslip angle of the aircraft;

receiving an aircraft roll input corresponding to at least one of an aircraft roll command and an aircraft roll rate;

utilizing a primary flight control system of the aircraft, determining that an operational thrust of the engine is to be limited;

upon determining that the operational thrust of the engine is to be limited, calculating a thrust differential of the aircraft with the primary flight control system using the aircraft sideslip input and an aircraft roll input; and limiting the operational thrust of the engine according to a maximum engine thrust limit.

9. The method of claim 8, further comprising deflecting a rudder of the aircraft to a maximum rudder deflection limit in a direction of the engine whose operational thrust is to be limited.

10. The method of claim 8, wherein calculating the thrust differential comprises:

determining a sideslip direction of the aircraft;

determining a rolling direction of the aircraft;

generating a non-zero yawing moment coefficient differential when the aircraft is sideslipping and rolling in a direction towards the operative engine; and supplying the non-zero yawing moment coefficient differential to a thrust differential calculator component.

11. The method of claim 8, wherein calculating the thrust differential comprises:

receiving a dynamic pressure of the aircraft;

determining a wing area of a wing of the aircraft;

determining the total yawing moment coefficient differential based on the sideslip input and roll input of the aircraft;

receiving an engine moment arm of the aircraft; and multiplying the dynamic pressure, the wing area, the wing span, the total yawing moment coefficient differential and the inverse of the engine moment arm of the aircraft to calculate the thrust differential of the aircraft.

12. The method of claim 8, wherein limiting the operational thrust of the engine according to a maximum engine thrust limit comprises determining whether the aircraft is sideslipping or rolling in the direction of the operating engine, and upon determining that the aircraft is yawing or rolling in the direction of the operating engine, reducing the operational thrust of the engine to the maximum engine thrust limit.

\* \* \* \* \*